United States Patent
Kuromizu et al.

(10) Patent No.: US 9,739,932 B2
(45) Date of Patent: Aug. 22, 2017

(54) LIGHT SOURCE MODULE AND DISPLAY APPARATUS

(71) Applicant: Sakai Display Products Corporation, Sakai-shi, Osaka (JP)

(72) Inventors: Yasumori Kuromizu, Sakai (JP); Yuki Horiguchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 3 days.

(21) Appl. No.: 15/022,510

(22) PCT Filed: Sep. 5, 2014

(86) PCT No.: PCT/JP2014/073557
§ 371 (c)(1),
(2) Date: Mar. 16, 2016

(87) PCT Pub. No.: WO2015/045814
PCT Pub. Date: Apr. 2, 2015

(65) Prior Publication Data
US 2016/0231500 A1    Aug. 11, 2016

(30) Foreign Application Priority Data
Sep. 24, 2013   (JP) ................................. 2013-197150

(51) Int. Cl.
*F21V 7/04*     (2006.01)
*F21V 8/00*     (2006.01)
*G02F 1/1333*   (2006.01)

(52) U.S. Cl.
CPC ........... *G02B 6/0088* (2013.01); *G02B 6/009* (2013.01); *G02B 6/0055* (2013.01); *G02B 6/0068* (2013.01); *G02B 6/0073* (2013.01); *G02B 6/0085* (2013.01); *G02F 2001/133317* (2013.01)

(58) Field of Classification Search
CPC .. G02B 6/0088; G02B 6/0073; G02B 6/0085; G02B 6/0068; G02B 6/0055; G02B 6/009
USPC ........................... 362/612, 613, 615, 249.02
See application file for complete search history.

(56) References Cited

U.S. PATENT DOCUMENTS

2011/0090699 A1    4/2011   Shida et al.

FOREIGN PATENT DOCUMENTS

| JP | 2008-300170 A | 12/2008 |
|----|---------------|---------|
| JP | 2012-054108 A | 3/2012 |
| JP | 2012-216528 A | 11/2012 |
| WO | WO2010004702 A1 | 1/2010 |

*Primary Examiner* — Vip Patel
(74) *Attorney, Agent, or Firm* — Bret E. Field; Bozicevic, Field & Francis LLP

(57) ABSTRACT

A light source module includes a substrate on which a light source is mounted, a light guide plate emitting light from one surface of the light guide plate, the light having entered the light guide plate through an end surface of the light guide plate, a frame body covering a periphery of the light guide plate, and a fixing element fixing the substrate to the frame body in a state where the substrate is put between the frame body and the fixing element, wherein the light source includes a plurality of LEDs arranged side by side along the end surface, and the fixing element is engaged with the frame body and includes a positioning part positioning the light guide plate in a direction along which the plurality of LEDs are arranged side by side.

9 Claims, 10 Drawing Sheets

LIGHT GUIDE PLATE SIDE

LIGHT SOURCE MODULE AND DISPLAY APPARATUS

CROSS-REFERENCE TO RELATED APPLICATIONS

This application is the national phase of PCT International Application No. PCT/JP2014/073557 which has an International filing date of Sep. 5, 2014 and designated the United States of America.

FIELD

The present invention relates to an edge light type light source module and a display apparatus comprising the light source module.

BACKGROUND

A liquid crystal display apparatus called a thin type, such as a liquid crystal television, comprises a display panel that has a substantially rectangular parallel-piped shape and a display surface for displaying an image at the front side, and a light source module that is placed at the rear side of the display panel and emits light to the display panel.

As a light source module, the direct light type, in which a diffusion plate and a support body for supporting the diffusion plate are placed at the rear side of the display panel and cold cathode fluorescent lamps (CCFLs) or light emitting diodes (LEDs) are placed at the rear side of the diffusion plate, and the edge light type, in which a light guide plate and a support body for supporting the light guide plate are placed at the rear side of the display panel and light emitting diodes are placed at a region facing a side surface of the light guide plate, are generally employed (see Japanese Patent Application Laid-open No. 2008-300170, for example).

Because in the edge light type light source module multiple light emitting diodes are arranged side by side to face the side surface of the light guide plate so as to emit, from one surface of the light guide plate, the light which has entered the light guide plate at the side surface thereof while diffusing the light therein, the edge light type light source module can decrease the thickness of the display apparatus, compared to the direct light type in which multiple light sources are placed side by side at the rear side of the diffusion plate.

Thus, employing the edge light type is advantageous to decrease the thickness of display apparatuses.

SUMMARY

In the direct light type light source module, because the multiple cold cathode fluorescent lamps or multiple light emitting diodes are arranged side by side to face the whole of one surface of the diffusion plate, the heat generated during the light emission of the light source is conducted to the entire support body that is made of a metal plate, which enables heat dissipation from the entire support body.

On the other hand, in the edge light type light source module, the distance between the light source and the light guide plate is generally designed to be short, because the light entrance efficiency is low and thus the required luminosity cannot be achieved when the space between the light source and the light guide plate is wide. Therefore, while the heat generated during the light emission of the light source is conducted to the light guide plate, there is a possibility that the heat from the light source expands the light guide plate, because of the high linear expansion coefficient of the light guide plate, so that the light guide plate makes contact with the light source and thus causes damage to the light source.

In addition, the light guide plate has a light scattering structure formed on the rear surface (the surface opposite to the light emitting surface) of the light guide plate by printing, casting or the like, a light scattering structure formed inside the light guide plate, and so forth, as a lighting element for emitting light toward the front surface, the light having entered the light guide plate through the side surface, for example. Therefore, the position of the light guide plate needs to be accurately designed in terms of not only the directions in which the diffusion plate makes contact with and separates from the light source but also, for example, the direction parallel to the direction of the arrangement of the LEDs.

The present invention is made in consideration of the above-described circumstances, and the object thereof is to provide a light source module capable of accurately positioning the light guide plate along the direction of the arrangement of LEDs and a display apparatus comprising the light source module.

A light source module according to one embodiment of the present invention, which includes a substrate on which a light source is mounted; a light guide plate emitting light from one surface of the light guide plate, the light having entered the light guide plate through an end surface of the light guide plate; a frame body covering a periphery of the light guide plate; and a fixing element fixing the substrate to the frame body in a state where the substrate is put between the frame body and the fixing element, the light source module is characterized in that the light source includes a plurality of LEDs arranged in a line along the end surface, and the fixing element includes a positioning part positioning the light guide plate in a direction along which the plurality of LEDs are arranged in a line.

The light source module according to the embodiment of the present invention, a fitting hole may be formed on another surface of the light guide plate, and the positioning part may be a fitted part being fitted into the fitting hole.

In the light source module according to the embodiment of the present invention, a reflection sheet member arranged to face said another surface of the light guide plate for reflecting light toward the one surface, the light having entered the light guide plate, may be included, wherein the frame body may include a side surface part covering a side surface of the light guide plate and a bottom surface part covering said another surface of the light guide plate, the fixing element may include a protrusion protruding toward the bottom surface part, the reflection sheet member may include an insertion hole through which the protrusion is inserted, and the reflection sheet member may be held while in a state of being put between the fixing element and the bottom surface part.

In the light source module according to the embodiment of the present invention, a length dimension of the fixing element from a surface of the substrate may be longer than a length dimension of the light source from the surface of the substrate.

In the light source module according to the embodiment of the present invention, a inclined surface inclined along the direction for increasing an emission angle of a light emitted from the light source at a part of the fixing element facing the light source may be included.

In the light source module according to the embodiment of the present invention, the fixing element may be molded with white-type resin.

A display apparatus according to one embodiment of the present invention, is characterized by including the light source module described above, and a display panel arranged to face the one surface of the light guide plate included in the light source module.

According to the embodiment of the present invention, because the fixing element is provided, which fixes the substrate on which the light source composed of multiple LEDs arranged in a line is mounted to the frame body in a state where the substrate is put between the fixing element and the frame body covering the side surface of the light guide plate, and the fixing element has a positioning part that positions the light guide plate in the direction of the arrangement of the LEDs, the light guide plate can be accurately positioned with respect to the LEDs so as to achieve good display quality. In addition, because the fixing of the substrate on which the light sources are mounted and the positioning of the light guide plate can be realized with the one fixing element, the number of parts can be reduced.

The above and further objects and features of the invention will more fully be apparent from the following detailed description with accompanying drawings.

DESCRIPTION OF EMBODIMENTS

The light source module according to one embodiment of the present invention and the display apparatus comprising the light source module will be described specifically, with reference to the drawings illustrating the embodiments thereof.

Embodiment 1

Figure 1:
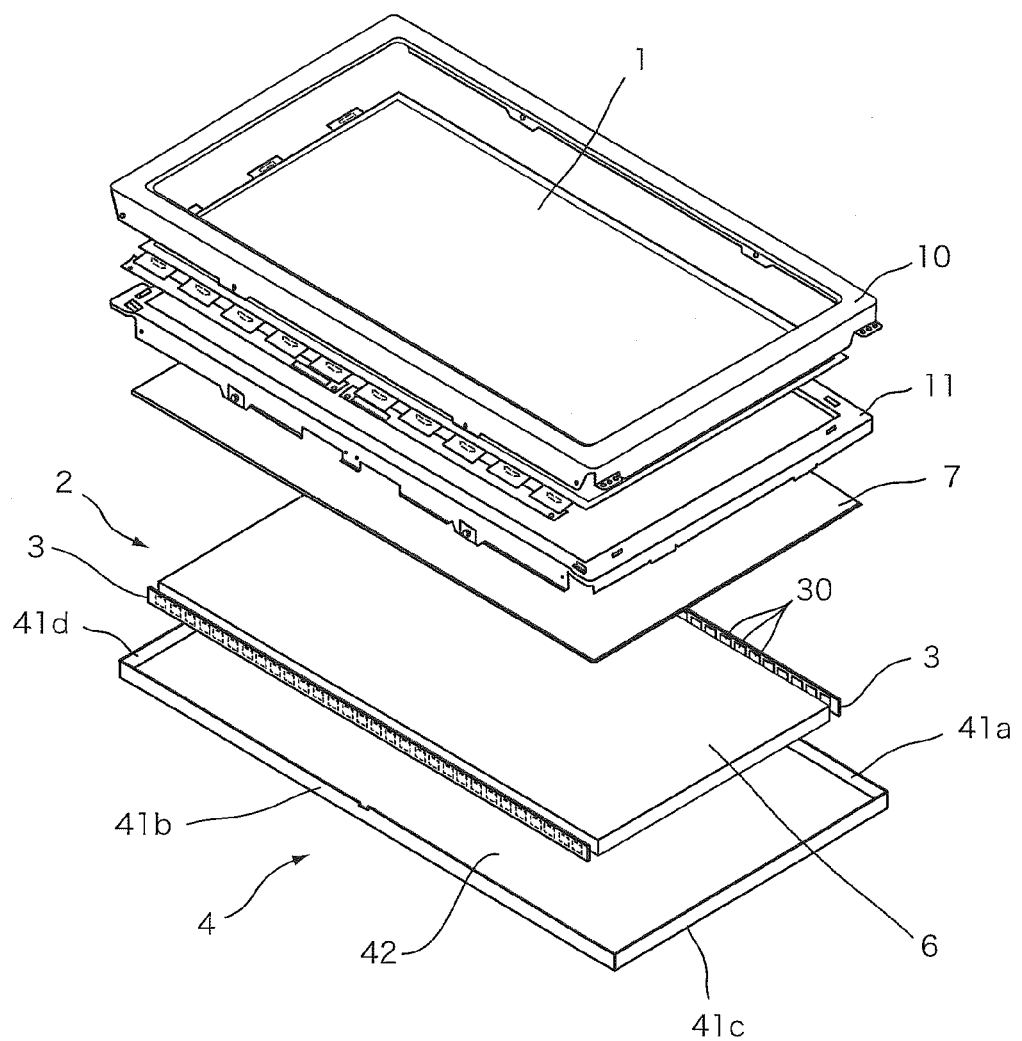
FIG. 1 is a schematic view illustrating the whole structure of a display apparatus according to Embodiment 1.
Figure 2:
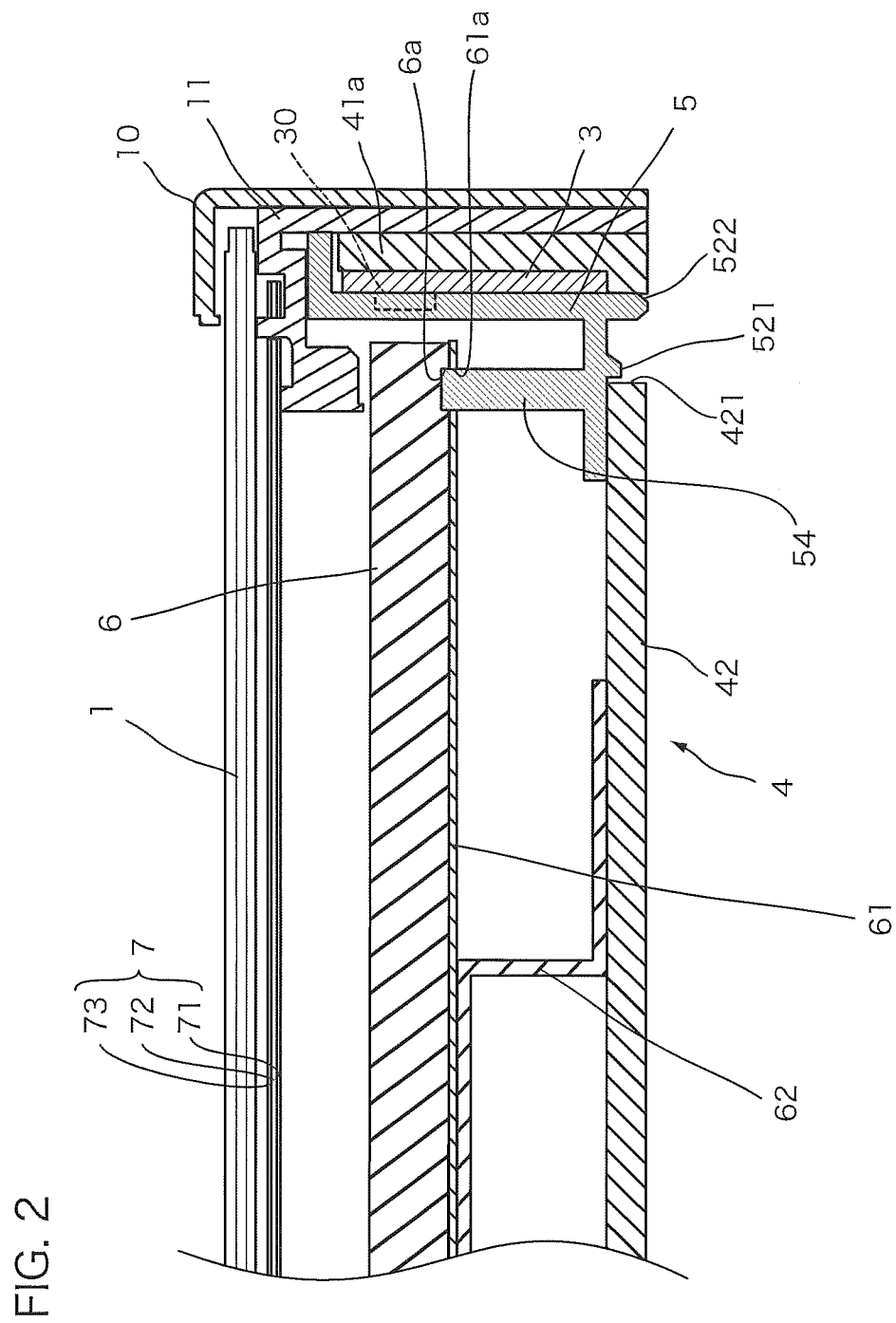
FIG. 2 is a cross-sectional view illustrating main components of the display apparatus according to Embodiment 1.

FIG. 1 is a schematic view illustrating the whole structure of a display apparatus according to Embodiment 1, and FIG. 2 is a cross-sectional view illustrating main components of the display apparatus according to Embodiment 1. In the present embodiment, a liquid crystal display apparatus comprising an edge light type light source module is described, as one example of the display apparatus according to one aspect of the present invention. The display apparatus comprises a liquid crystal panel 1 with a laterally wide rectangular shape and a light source module 2 placed to face the liquid crystal panel 1.

The periphery of the liquid crystal panel 1 is held between a bezel 10 and a pressing member 11, and the light source module 2 is provided inside this pressing member 11. The light source module 2 comprises an LED substrate 3 on which a number of LED chips 30, 30, 30 . . . are mounted in a state they are arranged linearly, a chassis 4 that covers the periphery of the LED substrate 3 and includes a function of a heat dissipator for dissipating the heat generated from the LED chips 30, an LED guard clip 5 as a fixing element for fixing the LED substrate 3 to the chassis 4, and a light guide plate 6 for emitting light toward the front surface (in the direction toward the liquid crystal panel 1), the light having emitted from the LED chips 30 and having entered the light guide plate 6 through the side surface.

While in the present embodiment two LED substrates 3, 3 are configured to be placed to face the upper and lower ends of the light guide plate 6 respectively, the LED substrate 3 may be placed to face one of the upper and lower ends or may be placed to face at least one of the left and right ends.

The light guide plate 6 is made of synthetic resin such as acrylic resin, polycarbonate resin, etc. and is formed in a substantially rectangular shape. A side surface of the light guide plate 6 is placed to face the LED chips 30, 30, 30 . . . on the LED substrate 3. At the region facing the rear surface of the light guide plate 6, a reflection sheet 61 that is made of synthetic resin with high reflectivity is provided.

On the light guide plate 6, a dot pattern, as a lighting element for emitting light toward the front surface, the light having entered the light guide plate 6 through the side surface, is printed, for example. As the lighting element, a light scattering structure formed on the rear surface (the surface opposite to the light emitting surface) of the light guide plate 6 by printing, casting or the like, a light scattering structure formed inside the light guide plate 6, an optical element that alters the light guiding direction, etc. may be used. The light scattered by the lighting element of the light guide plate 6 and the light reflected on the surface of the reflection sheet 61 are emitted toward the liquid crystal display 1. The light guide plate 6 and the reflection sheet 61 are placed inside the light source module 2, being positioned in plane by a positioning part 54 included in the LED guard clip 5. For such purpose, fitting holes 6a are provided at middle parts on the other surface near the upper and lower ends of the light guide plate 6, and insertion holes 61a are provided in the reflection sheet 61 at the corresponding positions to the fitting holes 6a. The other surface of the reflection sheet 32 is opposite to the one surface thereof. By inserting the positioning part 54 of the LED guard clip 5 through the insertion hole 61a of the reflection sheet 61 and fitting the positioning part 54 of the LED guard clip 5 into the fitting hole 6a of the light guide plate 6, the in-plane positions of the light guide plate 6 and the reflection sheet 61 are determined. Additionally, the portions around the middle of the light guide plate 6 and the reflection sheet 61 are supported by a bottom surface part 42 of the chassis 4 through a support member 62.

An optical sheet 7 that is formed by laminating a diffusion sheet 71, a prism sheet 72 and a polarizing sheet 73 is placed between the light guide plate 6 and the liquid crystal panel 1. The diffusing sheet 71 is a film made of PET or a film made of PC, for example, and includes a function to diffuse the light that has entered the diffusing sheet 71 from the light guide plate 6. The prism sheet 72 is fabricated, for example, by forming a regulatory prism pattern with acrylic resin on one side of a sheet member made of polyester. The polarizing sheet 73 is a film made of polyethylenenaphthalate, for example, and has a function to convert the light that is made to enter the liquid crystal panel 1 into linearly polarized light.

Figure 3:
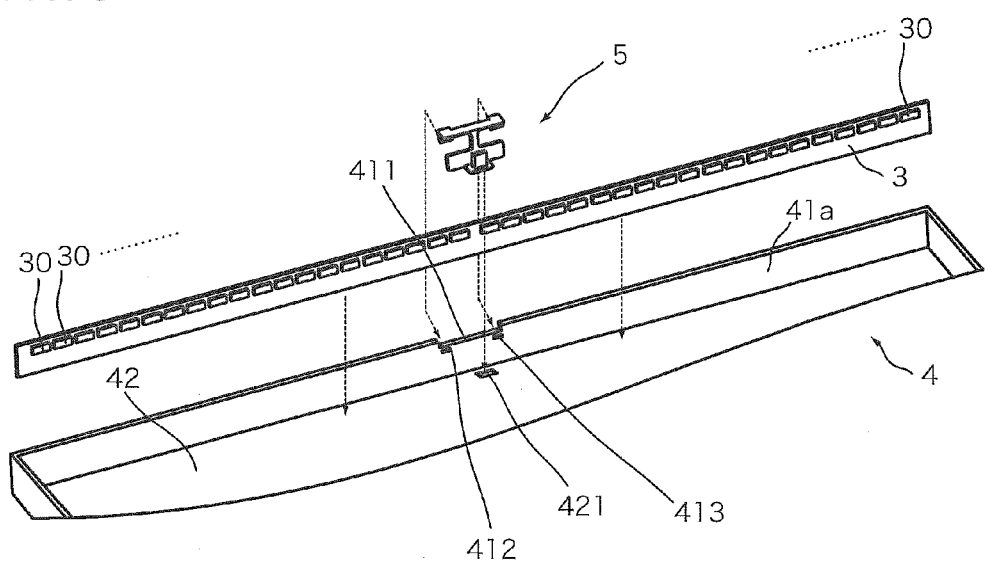
FIG. 3 is an explanatory drawing for explaining a method of fixing an LED substrate.
Figure 4:
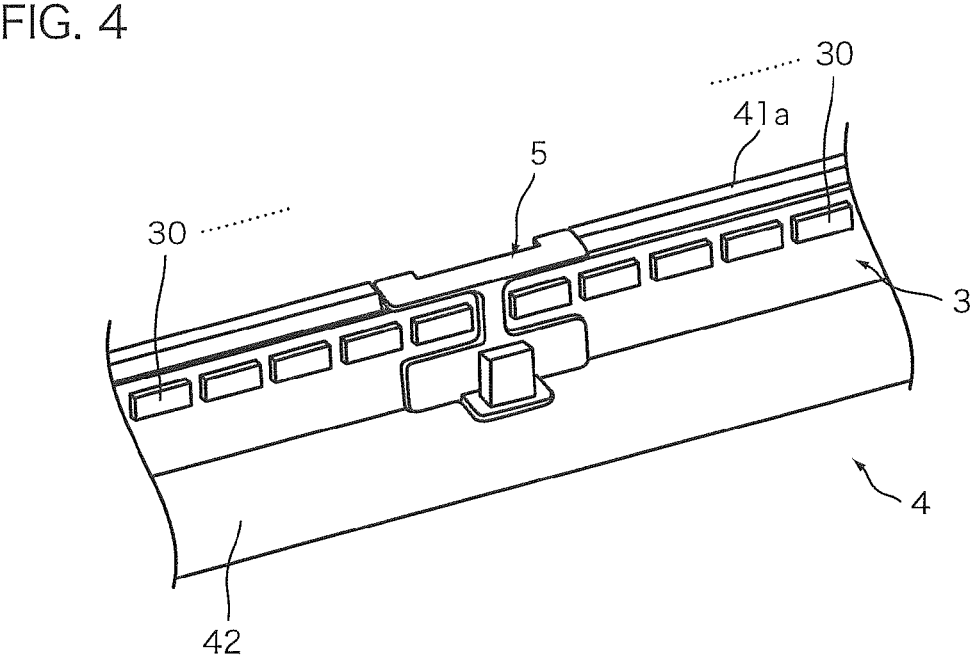
FIG. 4 is a schematic perspective view illustrating the state where the LED substrate is fixed.

FIG. 3 is an explanatory drawing for explaining a method of fixing an LED substrate 3, and FIG. 4 is a schematic perspective view illustrating the state where the LED substrate 3 is fixed. The LED substrate 3 is a narrow and laterally long substrate on which a number of the LED chips 30, 30, 30 . . . are linearly arranged along the longitudinal direction of the substrate. The number of the LED chips 30 provided on the LED substrate 30 is designed appropriately depending on the size of the display apparatus. For example, about seventy LED chips 30 are provided. It should be noted that an example where forty LED chips 30 are arranged is illustrated in FIG. 3 due to the limit of the available space on the drawing sheet.

Each one of the LED chips 30 has a substantially rectangular shape with a size of about 3 mm×5 mm in front view and a height (thickness of the LED chip 30) of about 1 mm from the surface of the substrate. The distance in the lateral direction between the adjacent LED chips 30, 30 is about 2 mm, except for the position where the LED guard clip 5 is placed, and the distance at the position where the LED guard clip 5 is placed is about 4.5 mm.

The chassis 4 is formed in the shape of a laterally long rectangular box with an opening toward the front surface, and has a plate-shaped bottom surface part 42 facing the light guide plate 6 and side surface parts 41a-41d vertically arranged from the edges of the bottom surface part 42. The chassis 4 is made of metal and is configured to release, toward the outside, the heat generated from the LED chips 30, 30, 30 . . . mounted on the LED substrate 30 during light emission of the LED chips 30, 30, 30 . . . .

In the present embodiment, the LED guard clips 5 are attached to portions around the middle along the longitudinal directions of the upper and lower side surface parts 41a, 41b of the chassis 4 respectively. For such purpose, a cutout part 411 for positioning the LED guard clip 5 is provided at the portion near the middle of the side surface part 41a along the longitudinal direction of the side surface part 41a, and two engaging holes 412, 413 are provided slightly below the cutout part 411. In addition, the bottom surface part 42 has an engaging hole 421 in the vicinity of the two engaging holes 412, 413. As the side surface part 41b has the same configuration, the side surface part 41b has a cutout part for positioning the LED guard clip 5 and two engaging holes positioned slightly below the cutout part, and the bottom surface part 42 has an engaging hole in the vicinity of the two engaging holes.

The attachment position of the LED guard clip 5 is positioned by the cutout part 411 provided on the side surface part 41a, so that the LED guard clip 5 is attached to the chassis 4 by being engaged with the two engaging holes 412, 413 on the side surface part 41a and the one engaging hole 421 on the bottom surface part 42. At that time, the LED substrate 3 is fixed to the chassis 4 by attaching the LED guard clip 5 to the chassis 4 in the state where the LED substrate 3 is put between the LED guard clip 5 and the side surface part 41a of the chassis 4.

Figure 5:
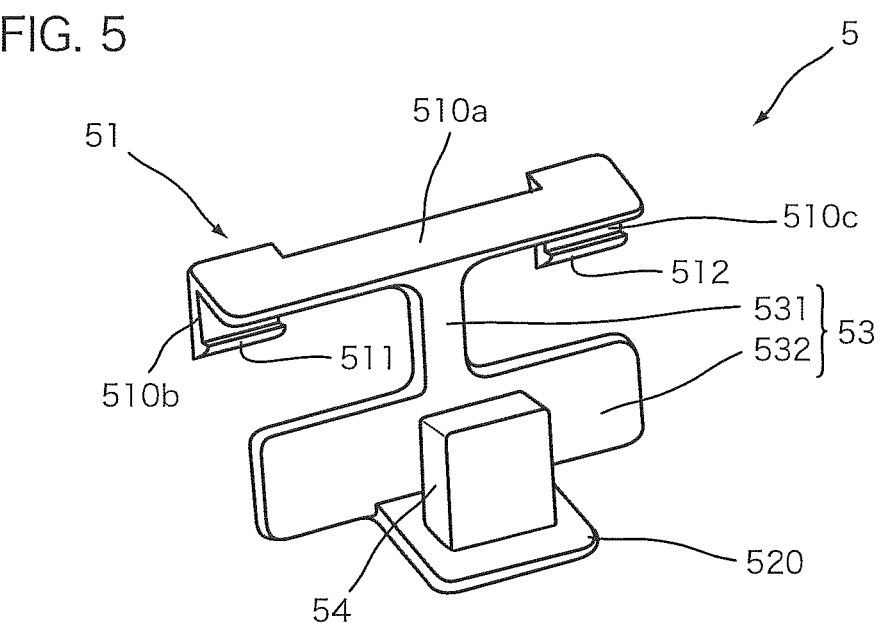
FIG. 5 is a perspective view of an LED guard clip.
Figure 6:
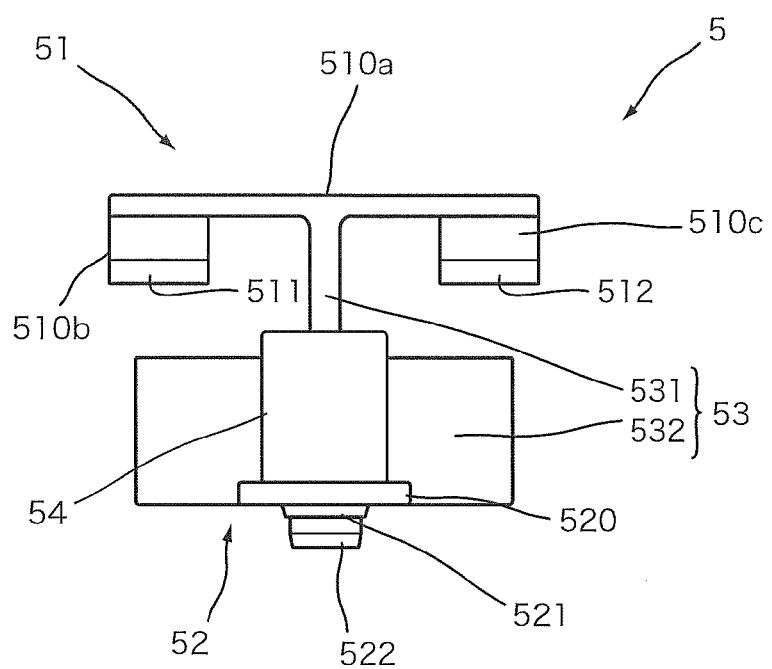
FIG. 6 is a front view of the LED guard clip.
Figure 7:
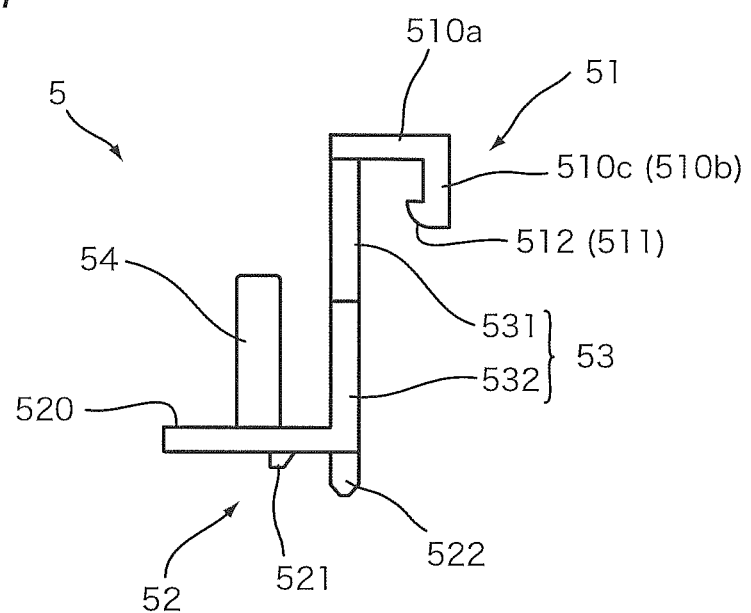
FIG. 7 is a side view of the LED guard clip.

FIG. 5 is a perspective view of the LED guard clip 5, FIG. 6 is a front view of the LED guard clip 5, and FIG. 7 is a side view of the LED guard clip 5. The LED guard clip 5 has an engaging part 51 toward the upper surface, an engaging part 52 toward the bottom surface, a holding part 53 continuous to both of the engaging part 51 and the engaging part 52, and the positioning part 54 projected upward from a bottom surface member 520 of the engaging part 52. The LED guard clip 5 is integrally molded with white-type resin.

The engaging part 51 is composed of an upper surface member 510a formed backward from the upper end of the holding part 53, protruding pieces 510b, 510c projected downward from two positions at the periphery of the upper surface member 510a respectively, and engaging protrusions 511, 512 projected forward from the lower ends of the protruding pieces 510b, 510c respectively. The engaging protrusions 511, 512 of the engaging part 51 is configured to be fitted into the two engaging holes 412, 413 provided on the side surface part 41a of the chassis 4 respectively to engage with the engaging holes 412, 413 (see FIG. 3).

The engaging part 52 has the bottom surface member 520 formed forward from the lower end of the holding part 53, and two engaging protrusions 521, 522 projected on the bottom surface of the bottom surface member 520. Such engaging protrusions 521, 522 are arranged along the front-rear direction of the LED guard clip 5 and are formed in that the height of the front engaging protrusion 521 from the bottom surface is smaller than that of the rear engaging protrusion 522. Both of the engaging protrusions 521, 522 of the engaging part 52 are configured to be fitted into the engaging hole 421 provided at the bottom surface part 42 of the chassis 4 to engage with the engaging hole 421 (see FIG. 2).

The holding part 53 of the LED guard clip 5 has a relatively narrow LED guard part 531 continuous to the engaging part 51 at the upper side and a relatively wide substrate supporting part 532 continuous to the engaging part 52 at the lower side.

The LED guard part 531 has a width of about 3 mm and a thickness along the front-rear direction of about 1.5 mm. While the LED guard part 531 cannot be placed between any adjacent LED chips 30 and 30 because the distance in the lateral direction between the adjacent LED chips 30 and 30 are about 2 mm except for the position where the LED guard clip is placed as described above, the LED guard part 531 can be placed between the two LED chips 30 and 30 near the middle, between which a relatively long distance (4.5 mm, for example) is provided.

The LED guard part 531 is arranged between the foresaid two LED chips 30 and 30 near the middle, the two engaging protrusions 511, 512 of the LED guard clip 5 are fitted into the engaging holes 412, 413 from the outside of the chassis 4 to engage with the engaging holes 412, 413, and the two engaging protrusions 521, 522 of the LED guard clip 5 is inserted into the engaging hole 421 of the chassis 4 to engage with the engaging hole 421, so that the LED substrate 3 can be secured in the state where the LED substrate 3 is held between the holding part 53 of the LED guard clip 5 and the side surface part 41a of the chassis 4. Because the LED guard clip 5 has the substrate supporting part 532 which is wide in the longitudinal direction of the LED substrate 3, the LED guard clip 5 can support the LED substrate 3 in a stable pose even if the LED substrate 3 is held at only one central position.

The positioning part 54 is a rectangular parallel-piped protrusion that is projected upward from the bottom surface member 520 of the engaging part 52, and is inserted through the insertion hole 61a in the reflection sheet 61 to be fitted into the fitting hole 6a in the light guide plate 6. The light guide plate 6 and the reflection sheet 61 can thereby be positioned in the direction along which the LED chips 30, 30, 30, . . . are arranged. Therefore, for example, the alignment accuracy between the dot pattern as a lighting element of the light guide plate 6 and the LED chips 30, 30, . . . arranged in a line on the LED substrate 3 can be improved to achieve good display quality.

Figure 8:
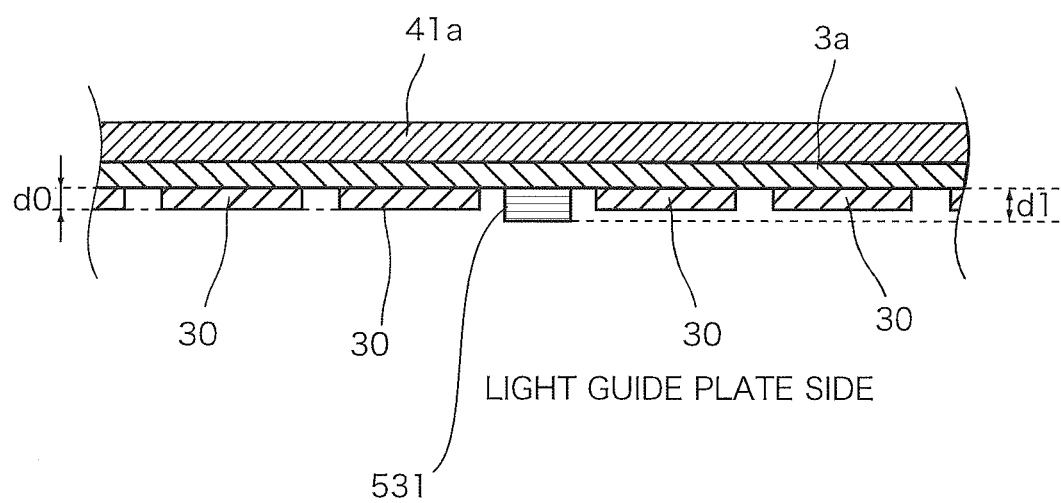
FIG. 8 is an explanatory drawing for explaining the relationship between the LED guard part and LED chips.

FIG. 8 is an explanatory drawing for explaining the relationship between the LED guard part 531 and LED chips 30. FIG. 8 illustrates a lateral cross section at the LED guard part 531. Each of the LED chips 30 mounted on the LED substrate 3 has a predetermined height d0 (about 1.0 mm, for example) from the surface of the substrate. On the other hand, the LED guard part 531 in the LED guard clip 5 has a thickness d1 (about 1.5 mm, for example) larger than d0.

It is to say that in the present embodiment the height of the LED guard part 531 from the surface of the substrate when the LED substrate 3 is held between the LED guard part 531 and the chassis 4 is larger than the height of each LED chip 30 from the surface of the substrate, so that the LED guard part 531 protrudes toward the light guide plate 6 from the surfaces of the LED chips 30. Therefore, even when the heat emitted from the LED chips 30 during light emission of LED chips 30 is conducted to the light guide plate 6 and the light guide plate 6 thereby expands in the in-plane direction, the light guide plate 6 makes contact with the surface of the LED guard part 53 first so that the contact between the light guide plate 6 and the LED chips 30 is prevented. Consequently, a damage to the LED chips 30 that would be caused by expansion of the light guide plate 6 can be avoided.

Additionally, in the present embodiment, because the LED guard clip 5 is made of white-type resin, the light emitted from the LED chips 30 can be reflected thereon, which prevents a shadow of the LED guard clip 5.

Moreover, in the present embodiment, because the LED substrate 3 can be attached to the chassis 4 without screws so that there is no need to make holes with a size that is enough to allow screws to be inserted through in the LED substrate 3, the space between the LED chips 30 can be made narrower to reduce unevenness of brightness that could occur if the space is wide.

Furthermore, in the present embodiment, because the LED guard clip 5 made of resin is used, heat transmission from the LED chips 30 to the light guide plate 6 can be reduced.

Embodiment 2

While in Embodiment 1 the lateral cross section of the LED guard part 531 has a substantially rectangular shape, the shape of the cross section is not limited to the rectangular shape. The cross section may be a trapezoidal shape, for example. In the present embodiment, the configuration in which the cross-sectional shape at the LED guard part 531 is a trapezoidal shape will be described.

It should be noted that the basic components such as the light source module 2 are identical to those in Embodiment 1 and thus will not be described.

Figure 9:
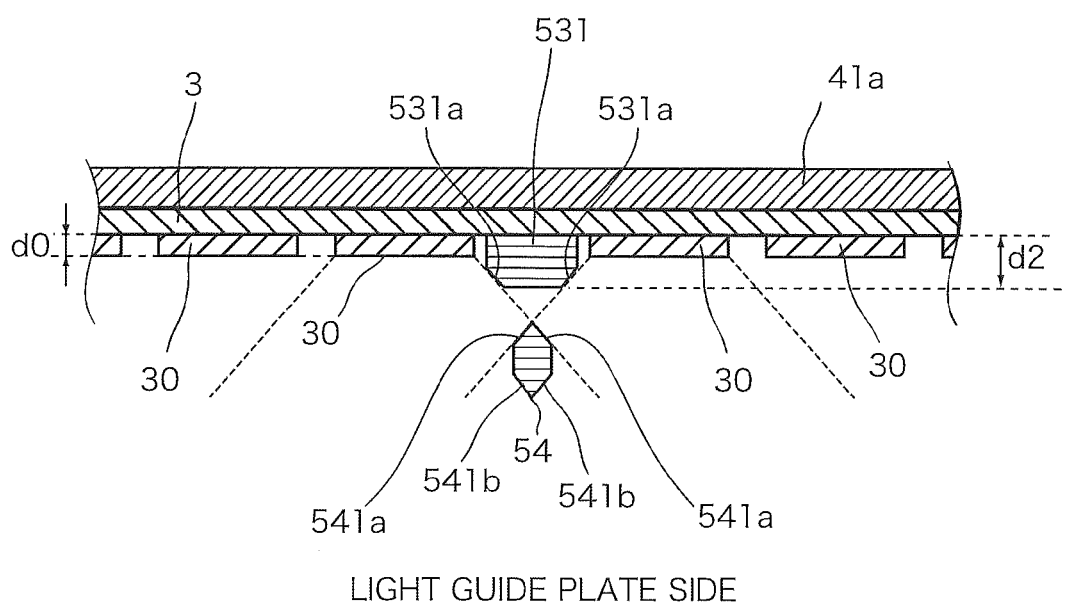
FIG. 9 is an explanatory drawing for explaining the relationship between the LED guard part and the LED chips in Embodiment 2.

FIG. 9 is an explanatory drawing for explaining the relationship between the LED guard part 531 and the LED chips 30 in Embodiment 2. FIG. 9 illustrates a lateral cross section at the LED guard part 531. Each of the LED chips 30 mounted on the LED substrate 3 has a predetermined height d0 (about 1.0 mm, for example) from the surface of the substrate. On the other hand, the LED guard part 531 in the LED guard clip 5 has a thickness d2 (about 2.0 mm, for example) larger than d0 or d1.

Similarly to Embodiment 1, the LED guard part 531 that protrudes toward the light guide plate 6 from the surfaces of the LED chips 30 is provided. Therefore, even when the heat emitted from the LED chips 30 during the light emission of the LED chips 30 is conducted to the light guide plate 6 and the light guide plate 6 thereby expands in the in-plane direction, the light guide plate 6 makes contact with the surface of the LED guard part 53 first so that the contact between the light guide plate 6 and the LED chips 30 is prevented. Because in Embodiment 2 the amount of protruding is greater than that in Embodiment 1, expansion of the light guide plate 6 toward the LED chips 30 can be effectively restrained.

In Embodiment 2, the shape of the lateral cross section at the LED guard part 531 is made to be a trapezoidal shape, and the part facing the LED chip 30 of the LED guard part 531 has inclined surfaces 531a, 531a that are inclined along the directions that increase emission angles of the light emitted from the LED chips 30. In addition, the positioning part 54 of the LED guard clip 5 has inclined surfaces 541a, 541a at the side facing the LED substrate 3 and inclined surfaces 541b, 541b at the side apart from the LED substrate 3. Such inclined surfaces 541a, 541a, 541b, 541b serve to avoid blocking the light emitted from the LED chips 30. Consequently, the range of the light emitted from the LED chips 30, 30 placed adjacent to the LED guard part 531 can be broadened, so that the unevenness of brightness can be effectively improved at the portions around the middle of the LED substrate 3 in the longitudinal direction where the space between the LED chips 30, 30 is made wide.

It should be noted that while in Embodiment 2 the shape of the lateral cross section at the LED guard part 531 is made to be a trapezoidal shape, the shape may be any shape that can broaden the range of the light emitted from the LED chips 30, 30, such as an ellipsoidal shape or a triangular shape.

Embodiment 3

While in Embodiment 1 it is configured that the portions around the centers of the light guide plate 6 and the reflection sheet 61 are supported by the support member 62, it may be configured that the light guide plate 6 and the reflection sheet 61 are supported by the bottom surface part 42 of the chassis 4.

It should be noted that the entire configuration of the display apparatus is similar to that in Embodiment 1 and thus will not be described.

Figure 10:
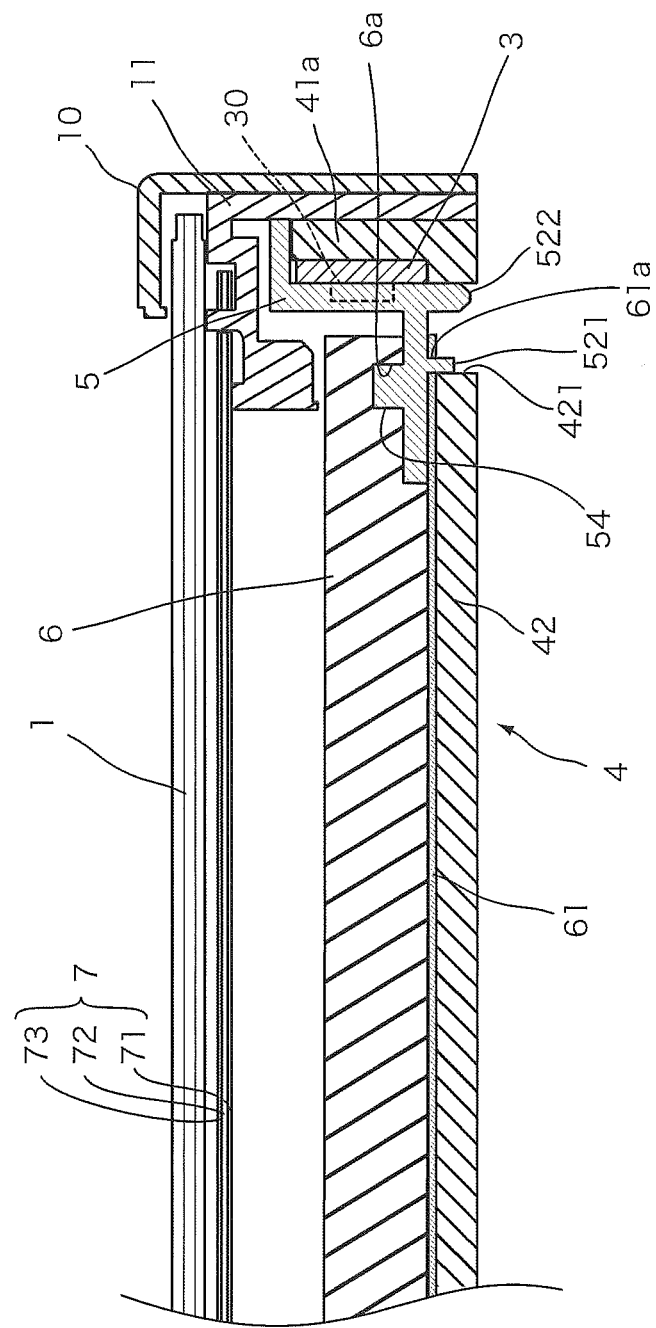
FIG. 10 is a cross-sectional view illustrating main components of the display apparatus according to Embodiment 3.

FIG. 10 is a cross-sectional view illustrating main components of the display apparatus according to Embodiment 3. In Embodiment 3, similarly to Embodiment 1, the light guide plate 6 and the reflection sheet 61 are placed inside the light source module 2, determined for their in-plane positions by the positioning part 54 included in the LED guard clip 5. For such purpose, fitting holes 6a are provided in the middle of the other surface near the upper and lower ends of the light guide plate 6, and insertion holes 61a are provided in the reflection sheet 61 at positions corresponding to the fitting holes 6a. By inserting the positioning part 54 of the LED guard clip 5 through the insertion hole 61a of the reflection sheet 61 and fitting the positioning part 54 of the LED guard clip 5 into the fitting hole 6a of the light guide plate 6, the in-plane position of the light guide plate 6 and the refection sheet 61 are determined.

In Embodiment 3, the reflection sheet 61 is held, being put between the bottom surface member 520 of the LED guard clip 5 and the bottom surface part 42 of the chassis 4. Therefore, the reflection sheet 61 is prevented from rising up from the other surface of the light guide plate 6, which prevents the occurrence of unevenness of brightness.

It should be noted that while the configuration of the display apparatus comprising the light source module 2 is described in Embodiments 1-3, the present technique may be applicable to a lighting device alone without the display panel 1 and the optical sheet 7.

Additionally, while in Embodiments 1-3 it is configured that the LED substrate 3 is fixed to the chassis 4 by one LED guard clip 5, it may be configured that multiple LED guard clips 5 are used to fix the LED substrate 3 to the chassis 4. For example, while in Embodiment 1 it is configured that the LED substrate 3 is fixed to the chassis 4 through one position around the middle of the LED substrate 3 in the longitudinal direction, it may be configured that the LED substrate 3 is fixed to the chassis 4 by attaching the LED guard clips 5 at multiple positions, such as the both ends of the LED substrate 3 in the longitudinal direction, or the portion around the middle and the both ends of the LED substrate 3 in the longitudinal direction.

While it is described that the LED substrate 3 and the LED guard clip 5 are separate bodies in Embodiments 1-3, it may be configured that the LED guard clip 5 and the LED substrate 3 are integrally formed. In such a case, an LED guard part may be provided at the portion near the middle in the longitudinal direction of the LED substrate 3, engaging protrusions to be fitted into the engaging holes 412, 413 of the chassis 4 to engage with the holes may be provided at the upper side of the LED substrate 3, and engaging protrusions to be fitted into the engaging hole 421 of the chassis 4 to engage with the hole may be provided at the lower side of the LED substrate 3. By fitting the two upper engaging protrusions provided on the LED substrate 3 into the engaging holes 412, 413 of the chassis 4 from the rear side to engage the protrusions with the holes, and fitting the two lower engaging protrusions provided on the LED substrate 3 into the engaging hole 421 of the chassis 4 to engage the protrusions with the hole, the attachment of the LED substrate 3 to the chassis 4 is completed. Hence, the same effect described in Embodiments 1 and 2 can be obtained.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims. In addition, the technical features described in each embodiment can be combined together.

It is noted that, as used herein and in the appended claims, the singular forms "a", "an", and "the" include plural referents unless the context clearly dictates otherwise.

The invention claimed is:

1. A light source module comprising:
a substrate on which a light source is mounted;
a light guide plate emitting light from one surface of the light guide plate, the light having entered the light guide plate through an end surface of the light guide plate;
a frame body covering a periphery of the light guide plate; and
a fixing element fixing the substrate to the frame body in a state where the substrate is put between the frame body and the fixing element, wherein
the light source includes a plurality of LEDs arranged side by side along the end surface, and
the fixing element is engaged with the frame body and includes a positioning part positioning the light guide plate in a direction along which the plurality of LEDs are arranged side by side.

2. The light source module according to claim 1, wherein the fixing element includes a protrusion to be engaged in a hole which is provided on at least one of a bottom surface part and a side surface part of the frame body.

3. The light source module according to claim 1, wherein a fitting hole is formed on another surface of the light guide plate, and
the positioning part is a fitted part being fitted into the fitting hole.

4. The light source module according to claim 3, wherein the another surface is a surface opposite to the one surface of the light guide plate.

5. The light source module according to claim 3 further comprising:
a reflection sheet member arranged to face said another surface of the light guide plate for reflecting light toward the one surface, the light having entered the light guide plate, wherein
the frame body includes a side surface part covering a side surface of the light guide plate and a bottom surface part covering said another surface of the light guide plate,
the fixing element includes a protrusion protruding toward the bottom surface part,
the reflection sheet member includes an insertion hole through which the protrusion is inserted, and
the reflection sheet member is held while in a state of being put between the fixing element and the bottom surface part.

6. The light source module according to claim 1, wherein a length dimension of the fixing element from a surface of the substrate is longer than a length dimension of the light source from the surface of the substrate.

7. The light source module according to claim 1 comprising:
an inclined surface inclined along the direction for increasing an emission angle of a light emitted from the light source at a part of the fixing element facing the light source.

8. The light source module according to claim 1, wherein the fixing element is molded with white-type resin.

9. A display apparatus, comprising:
the light source module according to claim 1; and
a display panel arranged to face the one surface of the light guide plate included in the light source module.

\* \* \* \* \*